United States Patent Office 3,716,627
Patented Feb. 13, 1973

1

3,716,627
PROCESS FOR THE PREPARATION OF VANADIUM CARBIDE

Servaas Middelhoek, Arnhem, Netherlands, assignor to N.V. Hollandse Metallurgische Industrie Billiton, Arnhem, Netherlands No Drawing. Filed Sept. 9, 1970, Ser. No. 70,886
Claims priority, application Netherlands, Sept. 9, 1969, 6913684
Int. Cl. C01b *31/30;* C22c *29/00*
U.S. Cl. 423—440 13 Claims

ABSTRACT OF THE DISCLOSURE

A process for the preparation of vanadium carbide from an oxidic, vanadium-containing material which comprises contacting the material at high temperature with a gas containing at least 60 volume percent thereof of at least one low molecular weight hydrocarbon in an amount not exceeding twice the stoichiometric amount. The CO and hydrogen produced as by-products can be used to furnish the heat energy required.

A process for the preparation of vanadium carbide from an oxidic, vanadium-containing material which comprises contacting the material at high temperature with a gas containing at least 60 volume percent thereof of at least one low molecular weight hydrocarbon in an amount not exceeding twice the stoichiometric amount. The CO and hydrogen produced as by-products can be used to furnish the heat energy required.

The invention relates to a process for the preparation of vanadium carbide from an oxidic, vanadium-containing starting material.

In recent years, there has been great interest in vanadium carbide, because it is an excellent means for the addition of vanadium to molten steel and that in this process it is more advantageous than the addition of vanadium in the form of ferrovanadium. For this application, the vanadium carbide should contain as little combined oxygen as possible and at most 2 percent by weight.

French Pat. 1,449,456 discloses a method for the preparation of vanadium carbide according to which finely divided vanadium oxide mixed with finely divided carbon are heated while an inert gas is passed continuously through or over them. The high temperature (approximately 1600° C.) as well as the expensive inert gas (argon) needed for this method make it less attractive from the economic point of view.

Previous attempts have been made to reduce oxidic, vanadium containing material by means of a mixture of methane and hydrogen. In these attempts, the reduction temperature was kept at approximately 800° C. while the hydrogen content in the reduction gas mixture was kept very high (>50%). The reason for this was the belief that a higher temperature and/or a higher methane content would give rise to considerable cracking of the methane and that, as a result, the production of vanadium carbide would be very seriously hampered. However, the low temperature and the low methane concentration required a very long reaction time.

However, surprisingly enough, it was found that by using a gas consisting predominantly or even entirely of hydrocarbons, it proved possible, even at fairly high temperatures, to produce vanadium carbides of excellent quality, provided the amount of gas used was not allowed to exceed a certain value. Therefore, the invention provides an economically attractive method for the preparation of vanadium carbide and is characterized by the fact that use is made of a gas containing at least 60 percent by volume of at least one hydrocarbon in the amount not exceeding twice the stoichiometric amount.

2

By the term "vanadium carbide" as used herein is meant a material consisting chiefly of compounds or mixtures of compounds of vanadium with carbon, including vanadium-carbon compounds deficient in carbon, as well as mixtures of these with free carbon.

By the term "stoichiometric" amount as used herein is meant the quantity theoretically needed for the conversion of all the vanadium in the starting material to vanadium carbide (taken as VC) and of all the oxygen to carbon monoxide, as well as that needed if desired for the formation of free carbon. Preferably, an amount of gas is used which does not exceed 1.3 times the stoichiometric amount.

The hydrocarbons which are suitable for the practice of the invention preferably contain no more than three carbon atoms. Methane is the preferred hydrocarbon but ethane and propane can be used. In addition to hydrocarbons, the gas used may contain, e.g., nitrogen, as is the case with the natural gas normally used in the Netherlands, which roughly contains 85% methane and 15% nitrogen. In that case, the vanadium carbide may contain a few percent combined nitrogen. Furthermore, some hydrogen may be added, but this is not necessary. For economic reasons, it is preferable to include no more than 10 percent by volume of hydrogen in the gas. It has been found unexpectedly that the gas may contain up to 20 percent by volume of CO without substantially affecting the process. The gas preferably contains at least 75 percent by volume of hydrocarbons.

According to the invention, it is possible to obtain in a single step vanadium carbide which is practically free from oxygen and which contains little uncombined carbon. However, if so desired, it is also possible by using the process of the invention to prepare a product which in addition to vanadium carbide also contains free carbon.

The process of the invention is preferably carried out continuously. It is advantageous that the stream of gas moves in the same direction as the stream of the material. The process can also be carried out as a fluid-bed or moving-bed process. A most suitable arrangement for carrying out this process continuously consists of one or more rotary tubular furnaces which are arranged at a slight angle in order to facilitate the transport of the material. In addition, it has proven feasible to carry out the process in a shaft furnace.

The gases leaving the equipment and which consist principally of CO and $H_2$ may directly (by burning or indirectly via conversion into electric energy) be used for keeping the reaction mixture at the required temperature.

Preferably, the process is carried out at a temperature between 850 and 1150° C., and preferably at a temperature between 950 and 1100° C. Any prereduction of, for example, $V_2O_5$ to $V_2O_3$ may take place at lower temperatures. This prereduction may, for example, be carried out with the gas obtained in the main reduction.

The vanadium carbide prepared according to the invention, possibly combined with a binder and/or other additives, lends itself very well to the formation of mouldings, such as briquettes, and can be added in this form to molten steel. Furthermore, the vanadium carbide may be used in metal-ceramic mixtures and in the so-called "hard" alloys.

The following examples show that the process in accordance with the invention makes it possible to obtain vanadium carbide with a low oxygen content.

EXAMPLE I

Natural gas was passed at a rate of 5 litres per hour over 10 grams of technical grade vanadium pentoxide for 2¼ hours at a temperature of 1050° C. The vanadium carbide obtained had the following analysis:

| | Percent by weight |
|---|---|
| Vanadium | 80.6 |
| Carbon | 15.8 |
| Oxygen | 0.4 |

The necessary heat was obtained by burning the CO and $H_2$ produced.

EXAMPLE II

A series of continuous tests was carried out in a heated rotating tube, which was tilted at a small angle to the horizontal plane in order to facilitate the transport of the material. The material was fed in and removed again continuously. The stream of natural gas moved in the same direction as the stream of the material. The material was kept for approximately 1¼ hours at the reaction temperature. The results are given in the table below:

| Technical-grade $V_2O_5$ fed in per hour, grams | Natural gas, l./hour | Temp., ° C. | Analysis of final products, percent | | | |
|---|---|---|---|---|---|---|
| | | | O | V | C | N |
| 11.5 | 15 | 1,050 | 1.2 | 80.5 | 15.2 | 1.6 |
| 12.4 | 16 | 1,050 | 0.5 | 80.1 | 16.5 | (1) |
| 15.5 | 21.5 | 1,050 | 0.3 | 80.0 | 17.5 | (1) |
| 15.4 | 19.3 | 1,050 | 0.4 | 79.7 | 17.2 | (1) |
| 40.0 | 43.5 | 1,025 | 1.8 | 79.8 | 16.1 | (1) |
| 16.1 | 28.9 | 1,000 | 0.5 | 80.7 | 15.6 | (1) |

[1] Not determined.

All of these examples were carried out with natural gas from Slochteren which contains approximately 85% methane and approximately 15% nitrogen. The fact that the analyses do not total 100% is due on the one hand to the vanadium carbide containing 1–2% nitrogen (from the nitrogen-rich natural gas) and on the other to the impurities in the starting material used.

EXAMPLE III

Pure methane was passed at a rate of 4½ litres per hour over 10 grams of technical grade vanadium pentoxide for 2¼ hours at a temperature of 1050° C. The vanadium carbide obtained had the following analysis:

| | Percent by weight |
|---|---|
| Vanadium | 77.1 |
| Carbon | 21.0 |
| Oxygen | 0.6 |

The necessary heat was obtained by converting in the known manner the CO and $H_2$ reduced to electrical energy and using the energy to produce heat.

The embodiments of the invention in which an exclusive property or privilege is claimed are defined as follows:

1. Process for the preparation of vanadium carbide having a low oxygen content from an oxidic, vanadium containing material comprising contacting said material at a temperature in the range from about 850° C. to 1150° C. with a hydrogen free feed gas containing at least 60% by volume of a hydrocarbon containing one to three carbon atoms in the molecule, in an amount which does not exceed twice the stoichiometric amount, said amount being sufficient for the conversion of all the vanadium in said material to vanadium carbide (taken as VC) and of substantially all of the oxygen to carbon monoxide.

2. A process according to claim 1, wherein said gas contains at least 75 percent by volume of hydrocarbons.

3. The process according to claim 1 wherein the amount of gas used does not exceed 1.3 times the stoichiometric amount.

4. The process according claim 1, wherein said contacting takes place at a temperature between 950 and 1100° C.

5. The process according to claim 1, wherein said gas and said material are moved in the same direction during said contacting.

6. The process according to claim 1 wherein CO and $H_2$ produced are converted to electrical energy and said energy is used to provide the heat necessary for said process.

7. The process according to claim 1, wherein said hydrocarbon is selected from the group of methane, ethane and propane.

8. Process as defined by claim 1 wherein said oxidic, vanadium containing material consists essentially of vanadium pentaoxide, wherein said gas consists essentially of about 85% methane and 15% nitrogen, by volume, and wherein said temperature is about 1050° C.

9. Process as defined by claim 1 wherein said gas consists of at least 75% by volume of said hydrocarbon the remainder being nitrogen.

10. Process as defined by claim 1 wherein said gas consists essentially of at least 75% by volume of said hydrocarbon the remainder being nitrogen and carbon monoxide.

11. Process as defined by claim 1 where said gas consists essentially of at least 75% by volume of methane the remainder being nitrogen and carbon monoxide.

12. Process as defined by claim 1 wherein said vanadium carbide contains less than 2% by weight of oxygen.

13. Process as defined by claim 1 wherein said process consists of a continuous process conducted at a temperature of about 1050° C., wherein said oxidic, vanadium containing material consists essentially of vanadium pentaoxide introduced into a heated rotating drum at a feed rate of about 11.5 to 16.1 grams per hour and wherein said gas consists essentially of about 85% methane and 15% nitrogen, by volume, concurrently introduced into said drum at a feed rate of about 15.0 to 28.9 liters per hour.

References Cited

UNITED STATES PATENTS

| | | | |
|---|---|---|---|
| 3,077,385 | 2/1963 | Robb | 23—208 A |
| 2,928,724 | 3/1960 | Mason et al. | 23—208 A X |

FOREIGN PATENTS

| | | | |
|---|---|---|---|
| 1,047,083 | 11/1966 | Great Britain | 23—208 A |

MILTON WEISSMAN, Primary Examiner

U.S. Cl. X.R.

106—43